United States Patent
LeBuffe

(10) Patent No.: US 7,943,039 B1
(45) Date of Patent: May 17, 2011

(54) CATCH BASIN FOR SALT WATER SAND

(76) Inventor: Calvin N. LeBuffe, Sarasota, FL (US)

( * ) Notice: Subject to any disclaimer, the term of this patent is extended or adjusted under 35 U.S.C. 154(b) by 0 days.

(21) Appl. No.: 12/621,009

(22) Filed: Nov. 18, 2009

(51) Int. Cl.
B01D 21/00 (2006.01)
E02B 8/02 (2006.01)

(52) U.S. Cl. ............... 210/154; 210/170.1; 210/171.11; 210/523; 210/532.1; 405/74

(58) Field of Classification Search ............... 210/154, 210/162, 170.09, 170.1, 170.11, 523, 532.1, 210/534, 535; 405/52, 74
See application file for complete search history.

(56) References Cited

U.S. PATENT DOCUMENTS

| | | | | |
|---|---|---|---|---|
| 249,954 | A | * | 11/1881 | Land .............................. 210/535 |
| 1,197,267 | A | * | 9/1916 | Cressy .......................... 210/154 |
| 1,388,040 | A | | 8/1921 | Hood |
| 2,436,630 | A | | 2/1948 | Clegg |
| 3,013,395 | A | * | 12/1961 | Gaylord ..................... 210/532.1 |
| 4,023,369 | A | | 5/1977 | Wirasinha |
| 4,031,009 | A | | 6/1977 | Hicks |
| 4,498,806 | A | | 2/1985 | Szonnell |
| 4,902,430 | A | | 2/1990 | Peterson |
| 5,143,623 | A | * | 9/1992 | Kroll ............................. 210/535 |
| 5,174,681 | A | | 12/1992 | Atkinson et al. |
| 5,888,020 | A | | 3/1999 | Brais et al. |
| 5,895,174 | A | | 4/1999 | Beaver |
| 6,042,733 | A | * | 3/2000 | Tucker ....................... 210/170.1 |
| 6,481,926 | B2 | | 11/2002 | Benedict et al. |
| 7,226,242 | B2 | | 6/2007 | LeBuffe |
| 2009/0097920 | A1 | * | 4/2009 | Tucker ........................... 405/74 |

* cited by examiner

Primary Examiner — Christopher Upton
(74) Attorney, Agent, or Firm — Charles J. Prescott

(57) ABSTRACT

A system for collecting the flow of sand and sediment in a water current including a catch basin and a seawater pumping arrangement. The catch basin includes a basin and a transfer tube, the basin having a bottom and a plurality of angled sidewalls defining a basin. The bottom basin aperture therethrough aligned with an aperture formed in the transport tube affixed horizontally below the bottom. The transfer tube preferably includes a wedge-shaped flow-enhancing cavity immediately downstream of the aligned apertures which enhances the flow of the sand and sediment from the basin. A longitudinal catch plate extending within a midportion of the transfer tube below the apertures prevents the sand and sediment from clogging the transfer tube when water flow through the transfer tube is off.

6 Claims, 12 Drawing Sheets

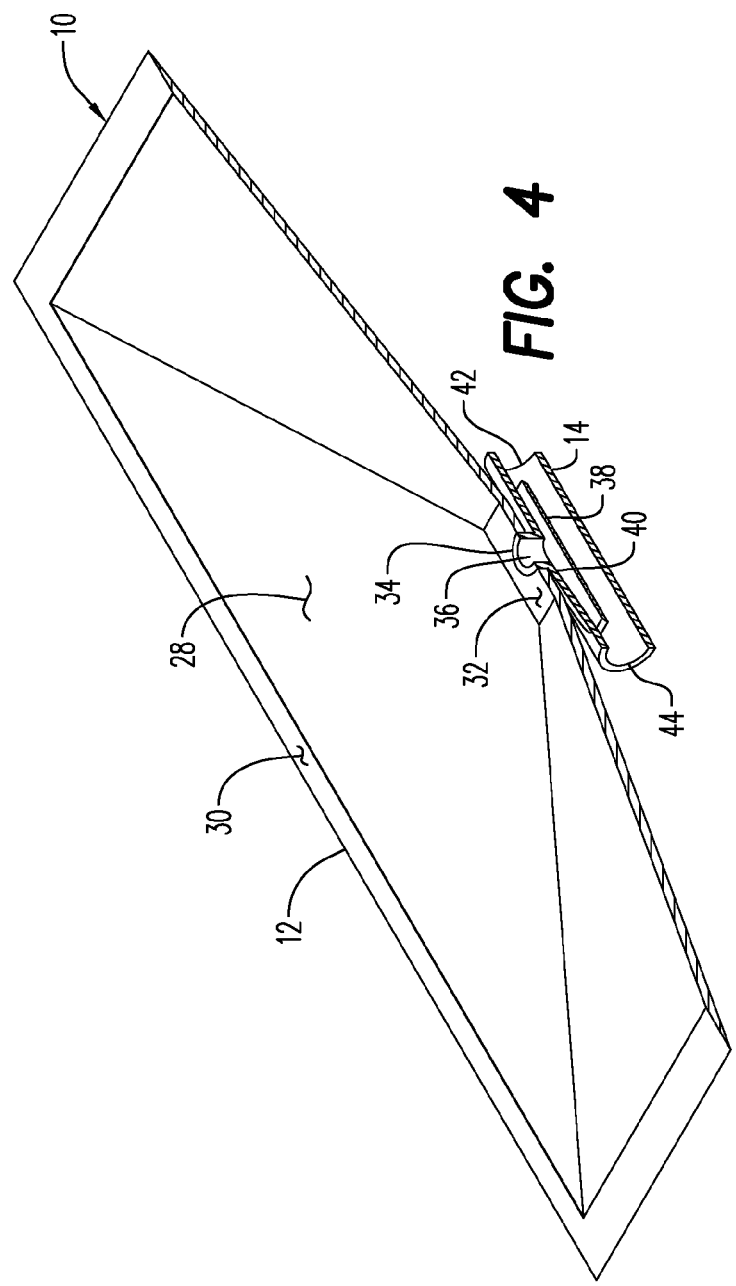
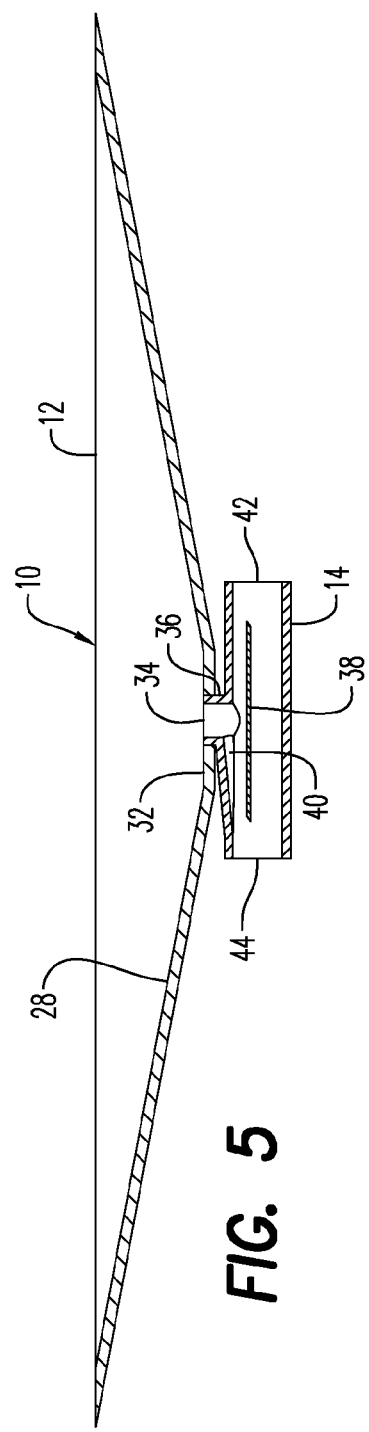
FIG. 4
FIG. 5

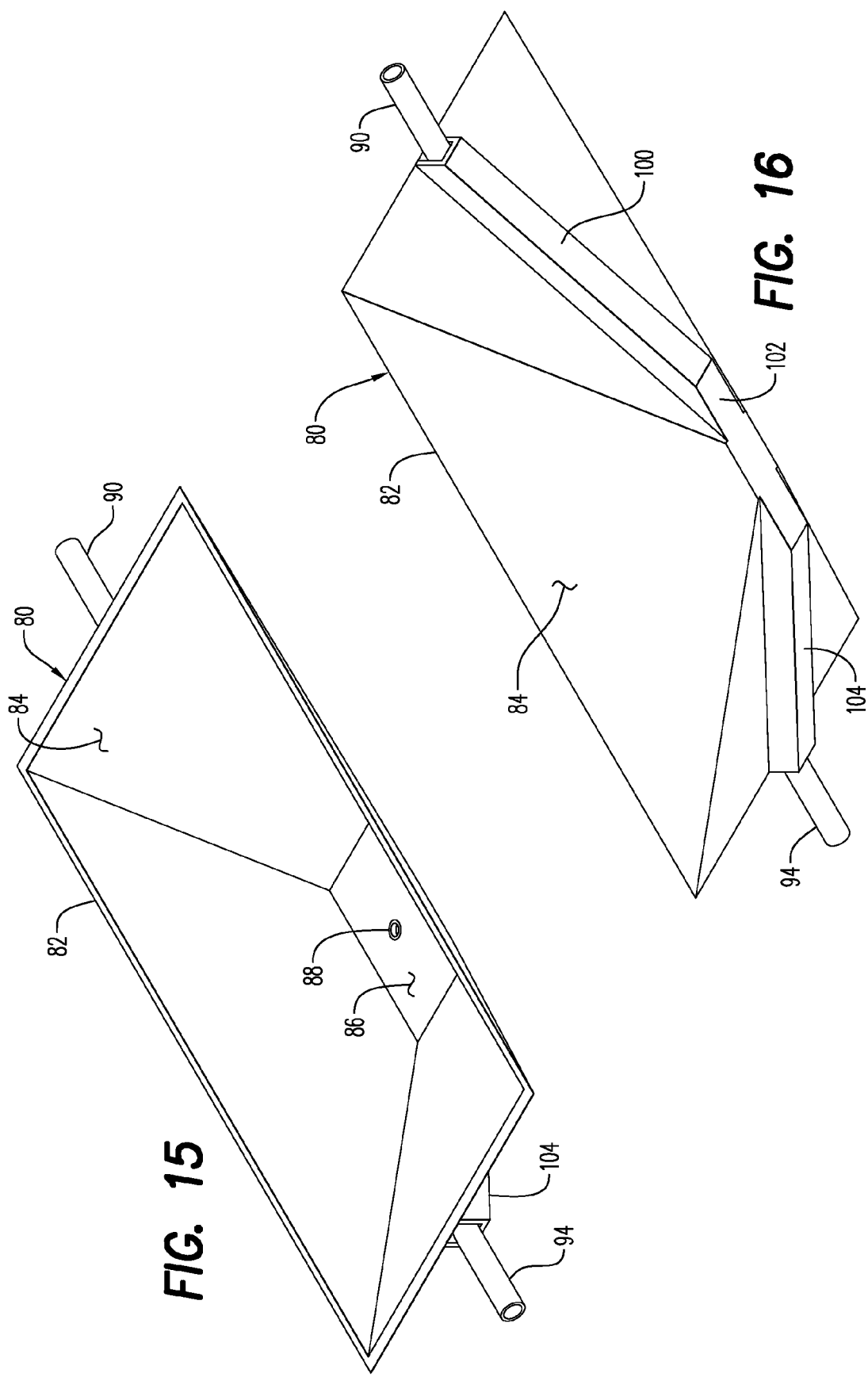

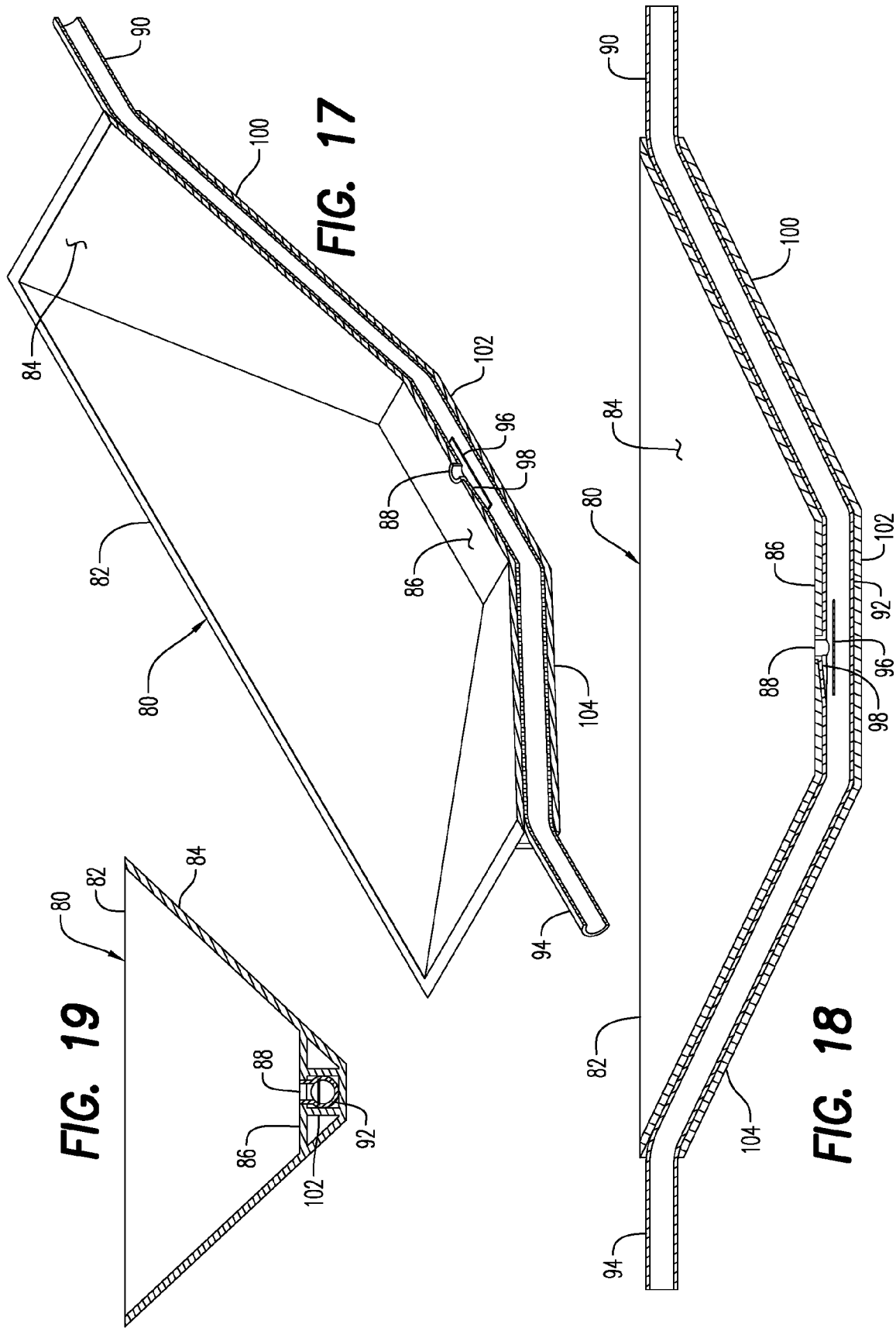

CATCH BASIN FOR SALT WATER SAND

CROSS-REFERENCE TO RELATED APPLICATIONS

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to systems for controlling buildup of sand and sediment in seawater inlets and particularly to an apparatus for preventing the formation of sandbars caused by current or tidal flow at passages such as the inlets to harbors, basins and estuaries.

2. Description of Related Art

Sand and sediment tends to accumulate in locations such as the entrances to harbors due to the deposit of sand and sediment by tidal flow of water. The existence of sandbars can create serious environmental and navigational hazards. Such accumulations require at least periodic dredging at great expense and disruption of water traffic.

A number of U.S. patents have been devoted to the problem of preventing beach erosion and the like. U.S. Pat. No. 4,498,806 discloses a beach erosion jetty configuration wherein the jetties are curved to stop or prevent a vacuum effect which causes beach erosion. Swift currents running in or out of inlets create a Venturi effect that pulls sand-laden waters from nearby and sometimes distant shorelines. In accordance with one aspect of applicant's U.S. Pat. No. 7,226,242, jetties are provided with curved ends that negate the loss of precious sand. Such curved jetties function as erosion control devices and actually stop and prevent erosion.

U.S. Pat. No. 4,023,369 discloses an apparatus and method carried out thereby for preventing formation of sand bars from sand or silt at the outlet of a body of water emptying from inland into another body of water, such as a lake or the sea and the like. At least one elongated gutter is provided at the outlet of a body of water from inland to another or receiving body of water, such as a lake or the sea. The gutter is disposed above the level of the water in the outlet and may or may not extend through the mouth of the outlet into the receiving body of water. Water is pumped into the gutter to an overflow condition so that it spills over the edges, and by gravity falls and creates a splash erosion condition.

U.S. Pat. No. 4,031,009 discloses a pre-cast reinforced concrete catch-basin of larger than conventional catch-basin dimensions, which includes a solid horizontal bottom wall with a solid, hollow, cylindrical side wall upstanding therefrom to about half the height of the catch-basin. The lower half thus forms a sealed, unapertured, undrained sump receptacle for collecting drain water and silt and allowing sand to settle out. The hollow, cylindrical, upper half contains leaching openings which extend through from the inside to the outside of the wall, from top to bottom, for discharging cleared water to the surrounding, stone-lined earth without plugging or clogging and without polluting nearby wells, brooks, etc.

U.S. Pat. No. 6,481,926 discloses a method and apparatus for land reclamation which includes utilizing groyne-like structures, including spaced stanchions to which are mounted porous screens and wherein the screens are vertically adjustable as material is deposited during the reclamation process. In some embodiments, the screens are carried by sleeves slidable on spaced stanchions. In other embodiments, the screens may be sectional and carried by multiple sleeves.

U.S. Pat. No. 5,174,681 discloses a permeable breakwater for submerged offshore or seawall retentive installation that includes a base and permeable opposed sides terminating at an upwardly projecting permeable wave wall. The breakwater is located offshore to cause moderate to heavy waves to break further offshore, thereby dissipating their energy before reaching the beach.

U.S. Pat. No. 5,888,020 discloses a sub-tidal platform adapted to be placed under water in front of a beach comprising a support structure having at least two upwardly extending, spaced-apart sidewalls extending along vertical planes. Each side wall has a bottom adapted to rest on a generally horizontal surface and a sloping, upwardly extending edge which is at an acute angle with respect to the bottom. A plurality of interconnecting members extends between the sidewalls for maintaining them in an upright position. The interconnecting members are positioned adjacent to the sloping edge of the sidewalls. A plurality of gates are pivotally connected to the interconnecting members of the support structure for controlling fluid flow through the space between the sidewalls. The gates open in response to incoming fluid flow through the gates and close in response to outgoing fluid flow in the opposite direction. The gates, when in their closed position, combine to form a sloping wall which substantially blocks the flow of fluid through the space between the sidewalls and deposits fluid-carried material in the space formed by the sidewalls and the sloped wall.

While there have been a number of prior art systems directed toward preventing beach erosion, there has not been a systems that adequately addresses the problem of preventing sand bar creation in inlets. There has not been a system that provides a simple, yet inventive basin which accumulates sand and sediment and efficiently removes such accumulations.

The present invention is directed to an improvement to a novel system which eliminates the accumulation of the sand or sediment that would normally be deposited on the bottom of an inlet, into a permanently deployed catch basin from which the sand/sediment can be continuously or periodically removed by water pumps capable of moving water and sand.

It is therefore an object of the present invention to provide a system which functions to prevent the accumulation of sediment in inlets and the like.

It is an object of the present invention to provide a system which permits the removal of sand and sediment accumulated into a catch basin by means of a pump and piping.

Still another object of this invention is to provide a system for the removal of sand and sediment buildup within a water inlet adjacent to a body of water which includes a catch basin having a uniquely configured transfer tube which facilitates the ongoing removal of sand and sediment which accumulates within a permanently installed catch basin.

The foregoing examples of the related art and limitations related therewith are intended to be illustrative and not exclusive. Other limitations of the related art will become apparent to those skilled in the art upon a reading of the specification and a study of the drawings.

BRIEF SUMMARY OF THE INVENTION

This invention is directed to a system for collecting the flow of sand and sediment in a water current including a catch basin having a bottom and a plurality of angled sidewalls tapering and downwardly converging to the bottom. The bottom has an aperture leading to a vertically aligned aperture formed at a midpoint in a transfer tube connected below the bottom. The transfer tube preferably includes a flow-enhancing cavity formed immediately downstream of the aligned apertures which helps to smoothly draw the sand and sediment from the basin. A longitudinal catch plate extending within a midportion of the transfer tube below the apertures prevents the sand and sediment from clogging the transfer tube when water flow through the system is off. A pumping system delivers seawater into the transfer tube to remove the sediment and sand from the basin.

In a preferred embodiment, the invention is a system for collecting sand and sediment in a flowing water current comprising a catch basin having a bottom and a plurality of angled sidewalls, the bottom having at least one aperture formed therethrough, a transfer tube operably connected beneath the bottom and aperture and to a water pumping system to remove the sediment and sand from the basin. The transfer tube preferably includes a flow-enhancing cavity formed proximate to an aperture formed through the wall thereof in vertical alignment with the bottom aperture for assisting in drawing sand and sediment from the catch basin into the transfer tube for removal.

In a further embodiment, the invention is a system for collecting the flow of sand or sediment comprising a catch basin, further comprising a plurality of angled sidewalls which converge with a bottom wall, the catch basin being placed at a predetermined location within a waterway to collect sediment and sand, one or a plurality of apertures on the bottom wall of the catch basin to permit the removal of sediment and sand from the basin, a uniquely configured transfer tube, a pumping system affixed to the transfer tube beneath and in fluid communication with the bottom aperture to remove the sediment and sand from the catch basin.

The ultimate preferred embodiment of the invention includes a protective screen fitted over the upper open perimeter of the catch basin to prevent intrusion of sea life and larger debris which would be detrimental to the operation of the system and to also protect sea life in the area. The preferred mesh size of the screen is 1" to 2" square.

The following embodiments and aspects thereof are described and illustrated in conjunction with systems, tools and methods which are meant to be exemplary and illustrative and not limiting in scope. In various embodiments one or more of the above-described problems have been reduced or eliminated while other embodiments are directed to other improvements. In addition to the exemplary aspects and embodiments described above, further aspects and embodiments will become apparent by reference to the drawings and by study of the following descriptions.

BRIEF DESCRIPTION OF THE SEVERAL VIEWS OF THE DRAWING(S)

FIG. 4 is a longitudinal section view of FIG. 2.

FIG. 5 is a side elevation view of FIG. 4.

FIGS. 15 and 16 are perspective views of a third embodiment of the invention.

FIG. 17 is a longitudinal section view of FIG. 15.

FIG. 18 is a side elevation view of FIG. 17.

FIG. 19 is a transverse section view of FIG. 17.

Exemplary embodiments are illustrated in reference figures of the drawings. It is intended that the embodiments and figures disclosed herein are to be considered to be illustrative rather than limiting.

DETAILED DESCRIPTION OF THE INVENTION

Figure 1:
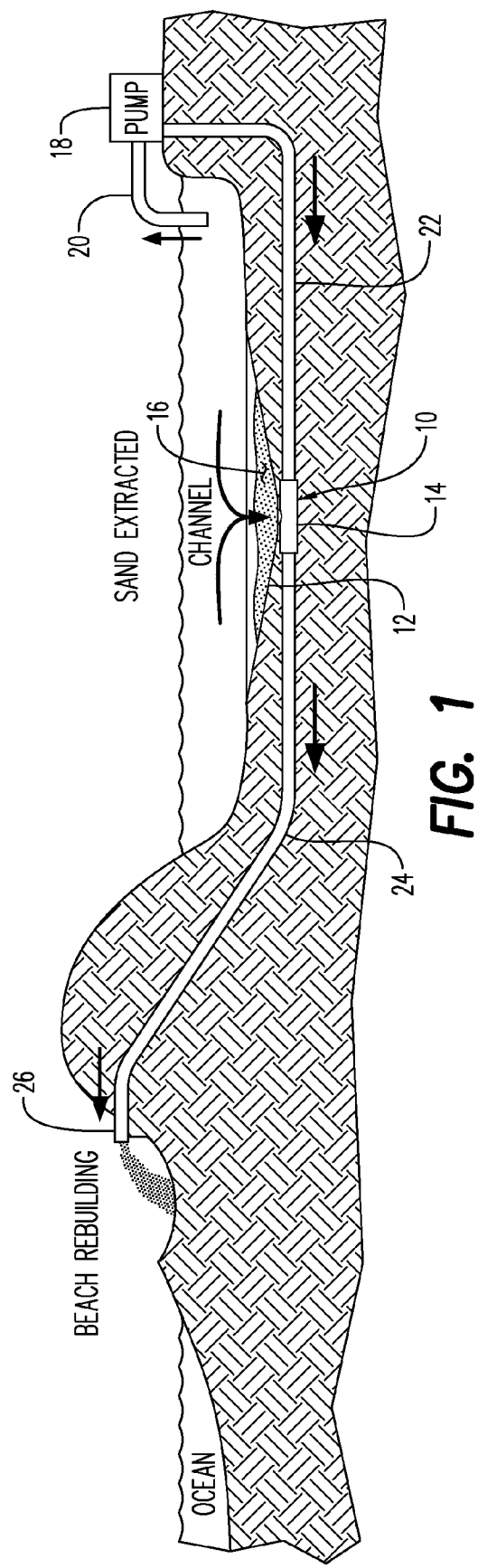
FIG. 1 is a pictorial section view of one embodiment of the invention deployed into the bed of a channel of flowing water.
Figure 3:
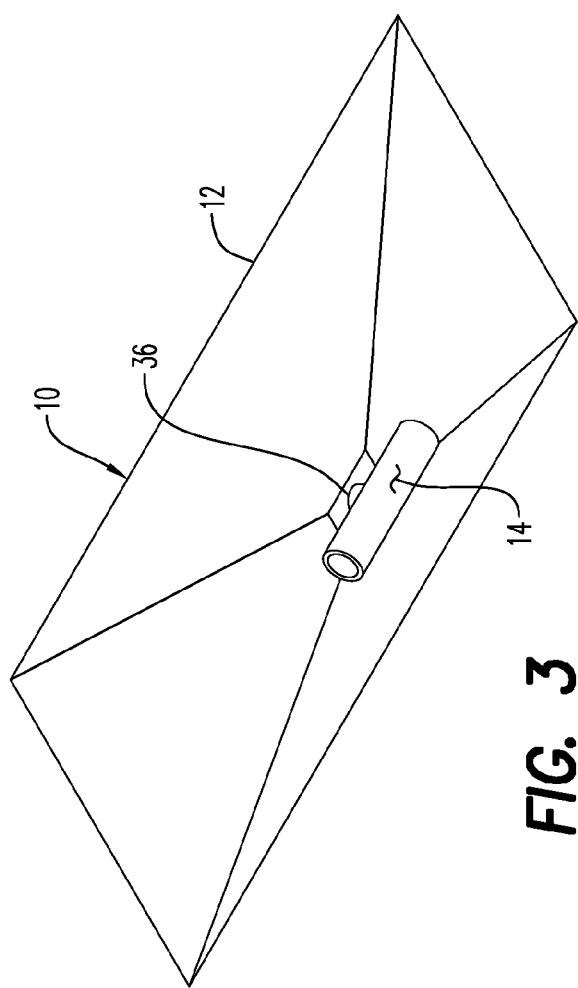
FIG. 3 is another perspective view of the catch basin of FIG. 1.
Figure 2:
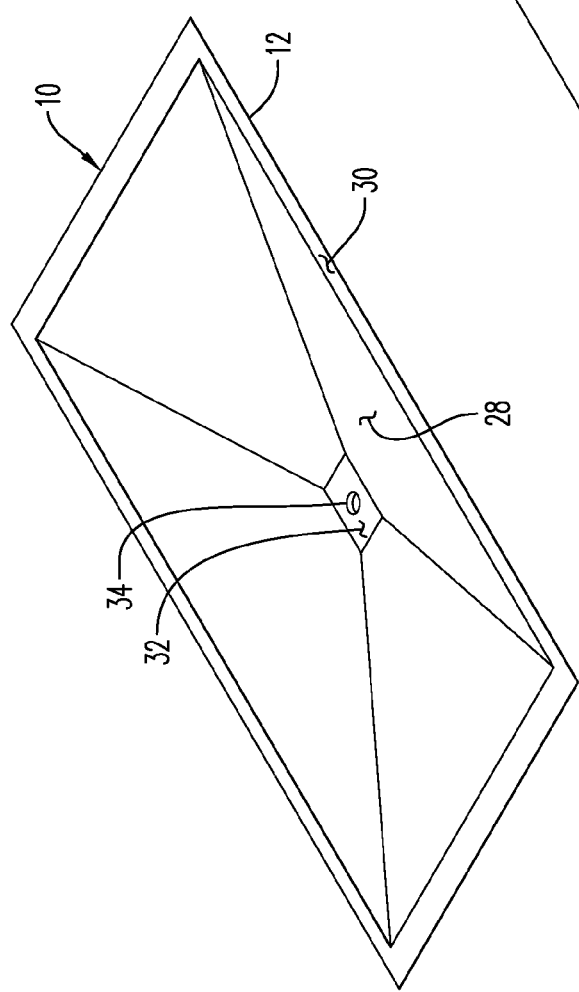
FIG. 2 is a perspective view of the catch basin shown in FIG. 1.

Referring now to the drawings, and firstly to FIG. 1, a sand and sediment removal and transfer system is shown deployed and in operation to prevent sand bar formation and includes a catch basin 10 which may be constructed from a pre-cast concrete or other composite material. The catch basin 10 is floated into position, or may be fabricated in sections and erected in the desired location.

The catch basin 10, in accordance with this disclosure may be constructed to have a length substantially equal to the width of the stream of water which creates the sand bars. This may be freely adjusted according to the situation. Alternatively, one or more catch basins 10 may be placed end to end to form a continuous chain of catch basins for wider inlets in order to attract the greatest amount of current and sediment.

The catch basin 10 will typically have a basin 12 with a width of twenty or more feet at its top with the sidewalls all shown and referred to typically at numeral 28 tapering down and converging toward a horizontal bottom 32 at an included obtuse angle of at least about 135° with respect to the bottom. The converging walls 28 merge with the bottom 32, which is approximately two feet wide. The overall depth of the catch basin 10 is preferably approximately ten feet. Both dimensions may be freely adjusted according to the need and usage.

It is to be appreciated that the inclination angles of the basin walls 28 in correlation to the basin bottom 32 are preferably determined by the volume of current and level sediment through the area being covered (inlet, estuary, etc.). This positioning (and angles) of walls, the size of the basin 12, the depth of basin 12, and physical anchoring position of basin 12 for usage are expected to be determined by professional engineers associated with each project.

The catch basin 10 can be constructed from metal, concrete reinforced with glass fiber mesh or other appropriate composite material. The catch basin 10 can be pre-cast in one unitary body and floated to its desired position for installation. Alternatively, the basin may be constructed from layers, in layers, or segments which may be positioned relative to each other and cemented into a permanent structure. Whether the catch basin 10 is formed as a unitary structure or of separate sections and cemented together, the location in the inlet would be below the desired bottom level of the inlet. For example, the depth could be at a depth of approximately ten feet below the mean water level to ensure that vessels with no more than that draft could make passageway in the inlet, flanges 30 preventing excessive sinking into a soft silt bottom. This may be adjusted according to need and usage. The catch basin 10 is preferably formed so that its interior walls 28 are preferably substantially smooth. This permits the movement of accumulated sand and sediment toward the bottom of the catch basin 10.

With the basin 10 disposed as illustrated in FIG. 1, the tidal flow would cross the catch basin 10 and the sand carried by the tidal water would tend to be deposited into the basin 12 rather than on the normal bottom of the channel. The sand and sediment, thus accumulated, can be periodically removed by pump 18 and pipes 22 and 24, which are connected to transfer tube 14 in the bottom of the basin 10.

Figure 7:
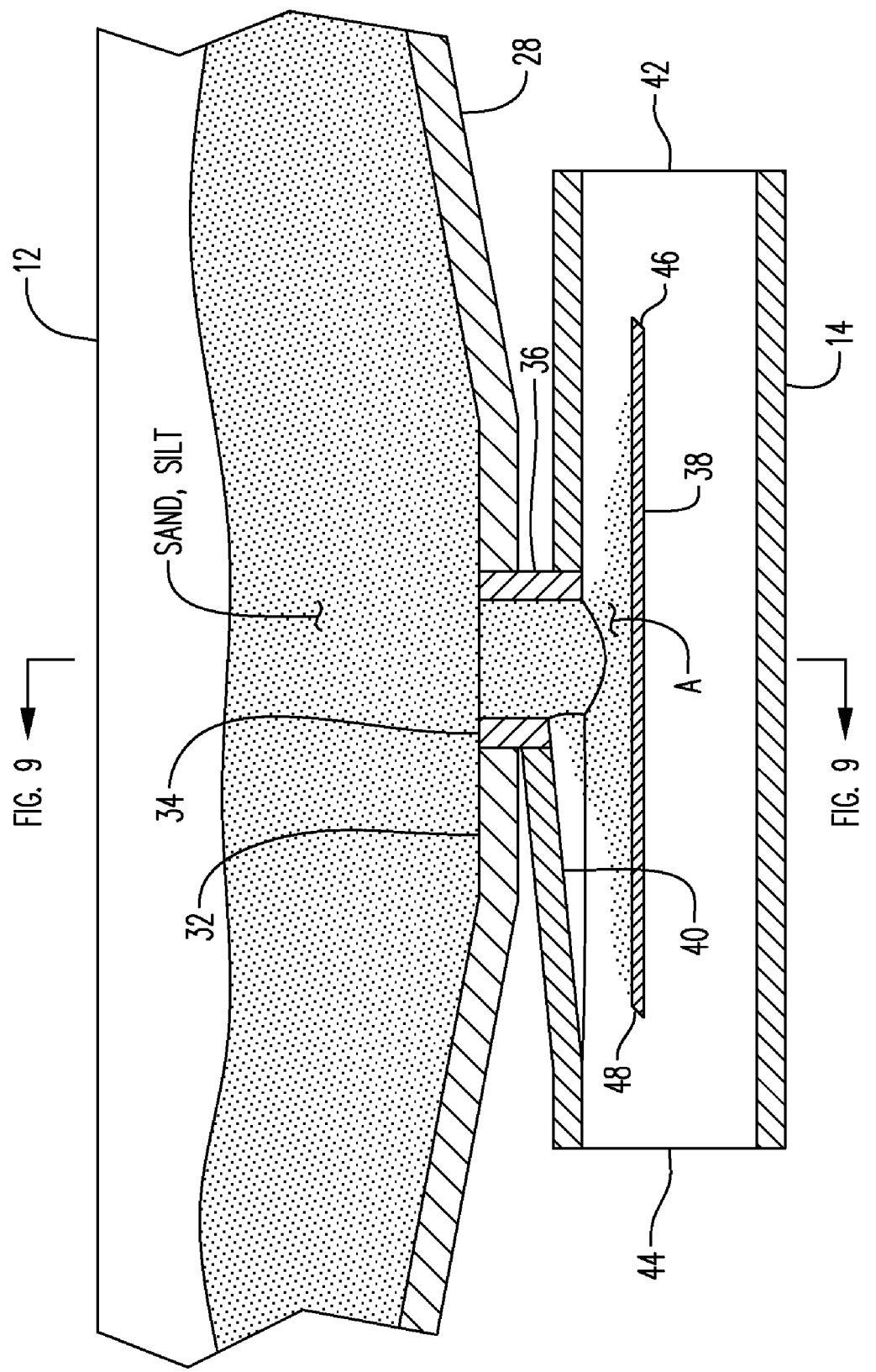
FIG. 7 is an enlarged longitudinal section view of a portion of FIG. 5 showing the accumulation of sand and silt when seawater is not flowing through the transfer tube.
Figure 8:
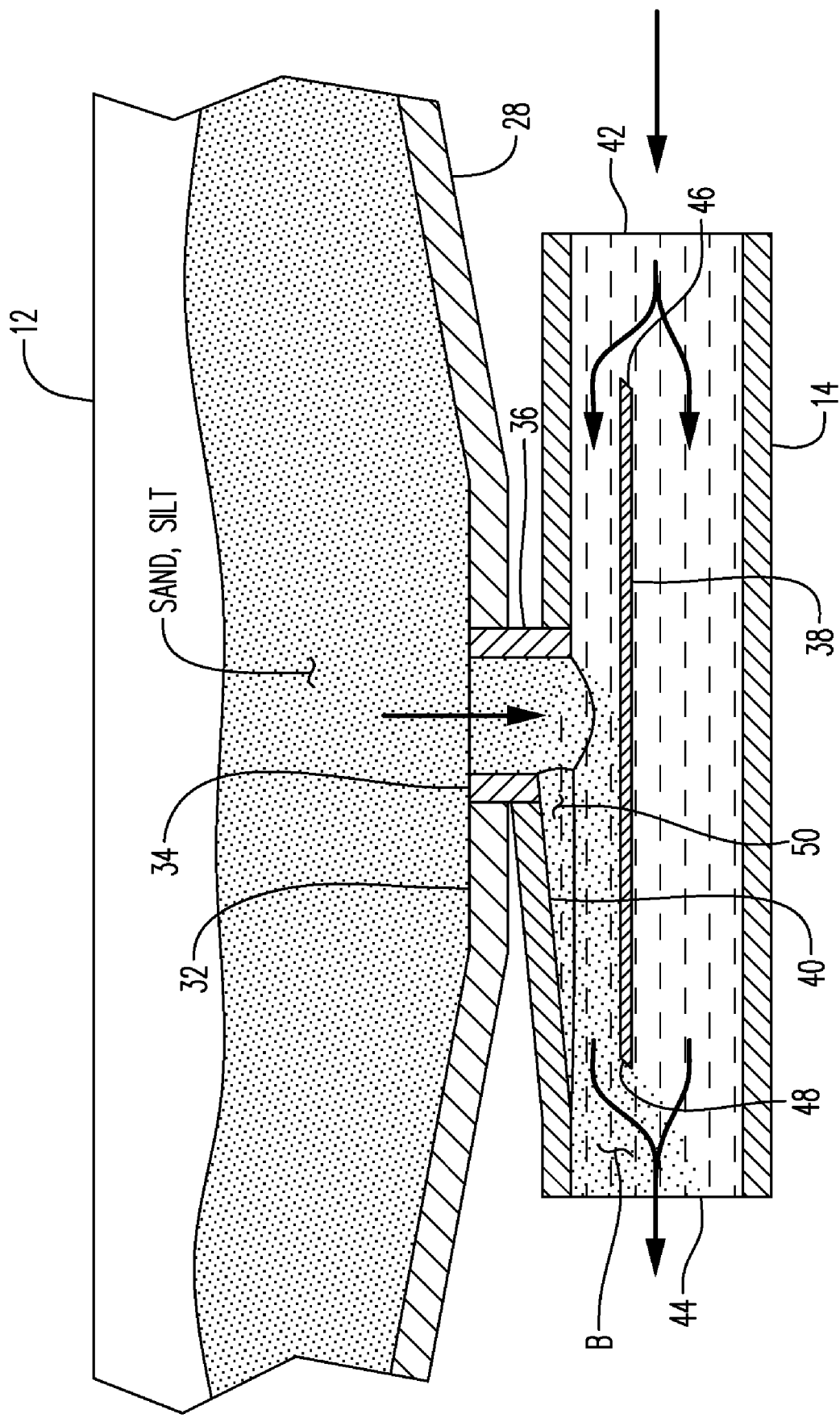
FIG. 8 is a view of FIG. 7 with seawater flowing through the transfer tube.
Figure 9:
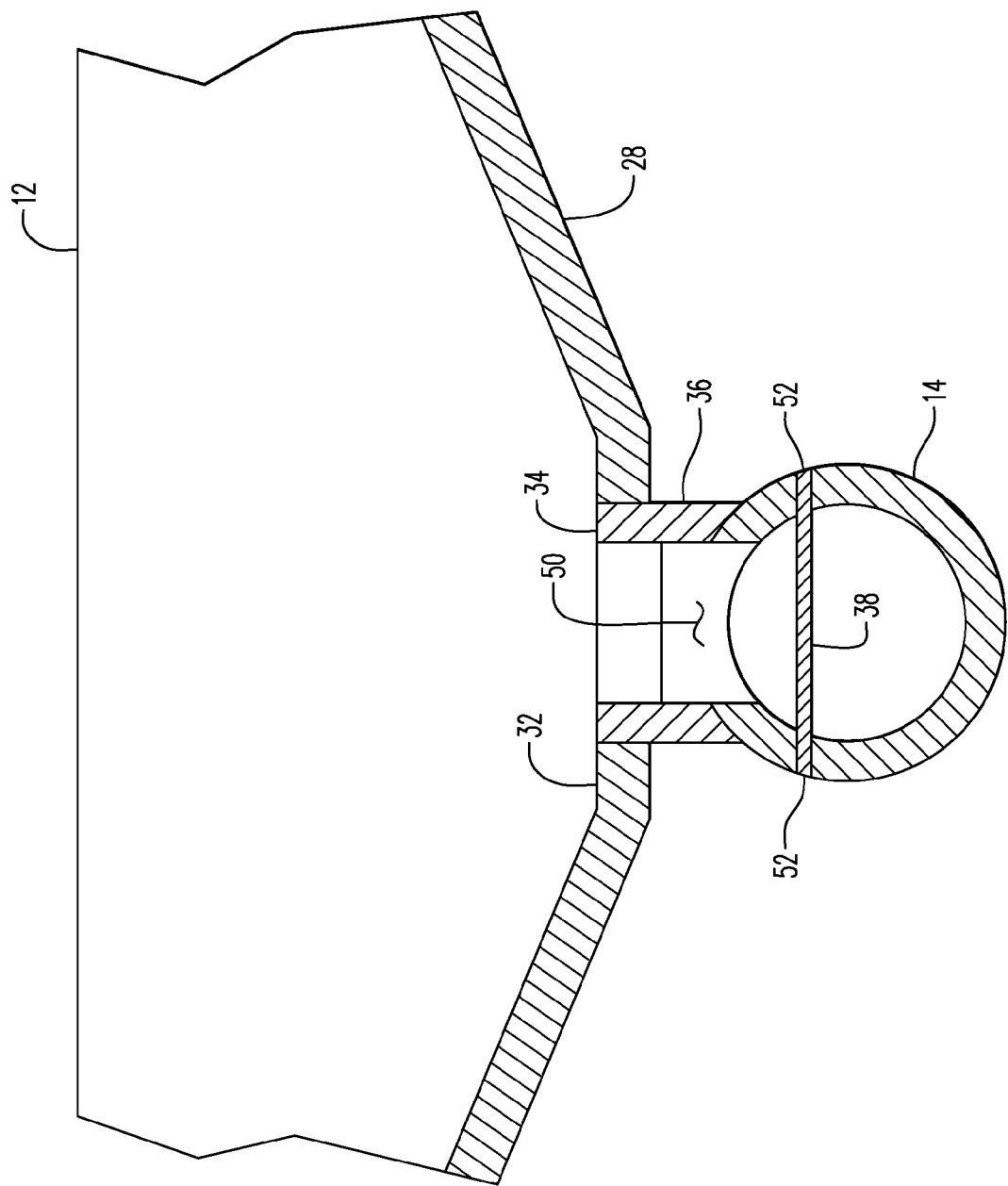
FIG. 9 is a transverse section view through the central lower portion of FIG. 5.
Figure 11:
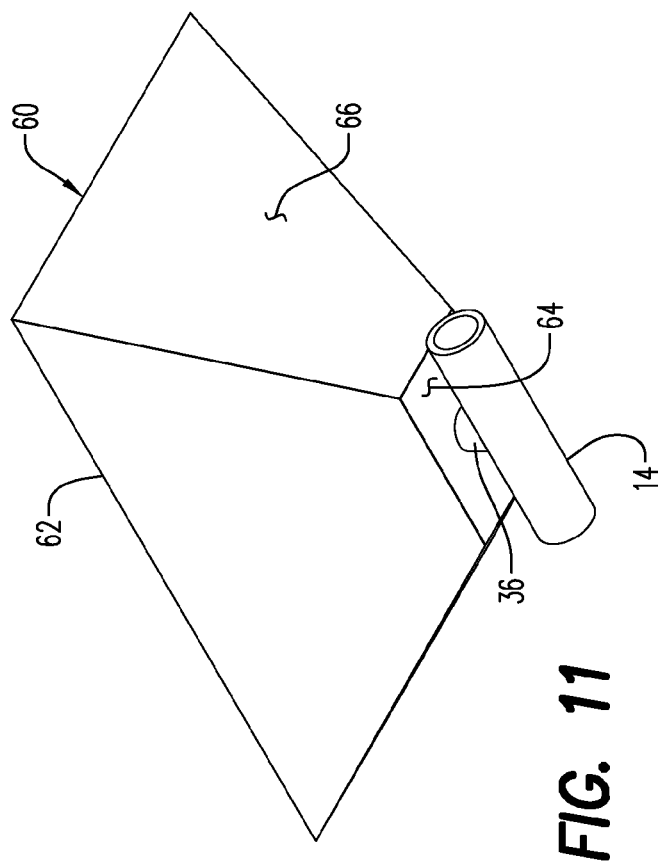
FIG. 11 is a lower perspective view of FIG. 10.
Figure 10:
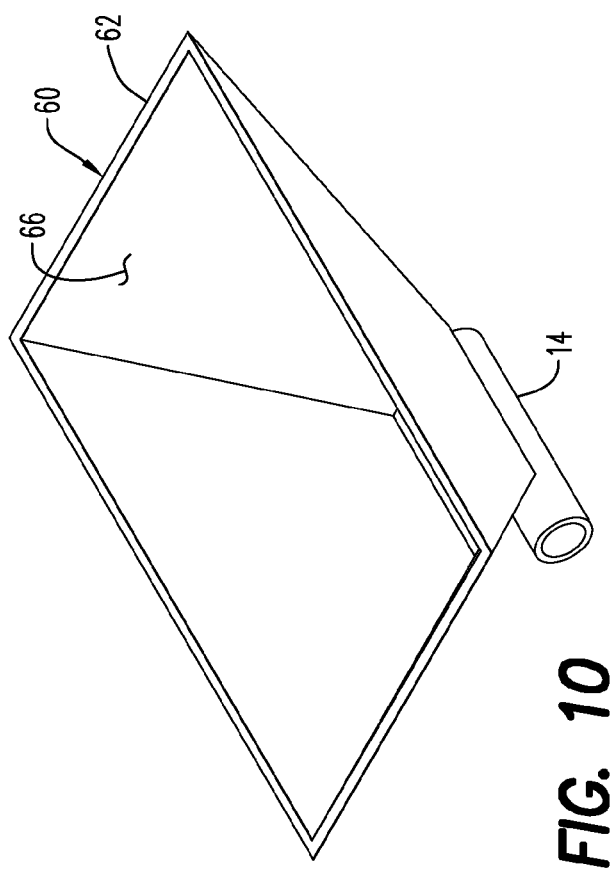
FIG. 10 is a perspective view of another embodiment of the catch basin of the system.
Figure 12:
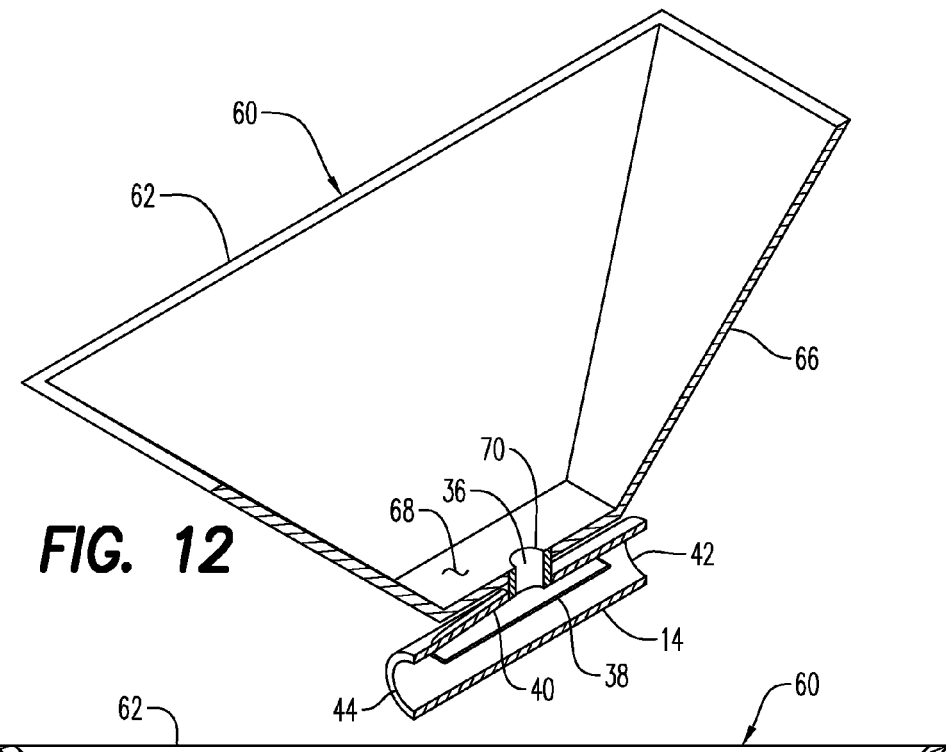
FIG. 12 is a longitudinal perspective view of FIG. 10.

Referring additionally to FIGS. 2 to 9, the preferred embodiment of the catch basin 10 as previously described, includes the basin 12 and an elongated sand and sediment transfer tube 14 having an open inlet end 42 and an open discharge end 44. Positioned at a midpoint along the length of the transfer tube 14 is a short upstanding connecting tube 36 which defines an aperture 34 positioned centrally in the flat horizontally disposed bottom 32. The connecting tube 36 being in fluid communication with the interior of the transfer tube 14 as best seen in FIG. 9 also affixes the transfer tube 14 in close proximity below the bottom 32 of the catch basin 12.

Figure 6:
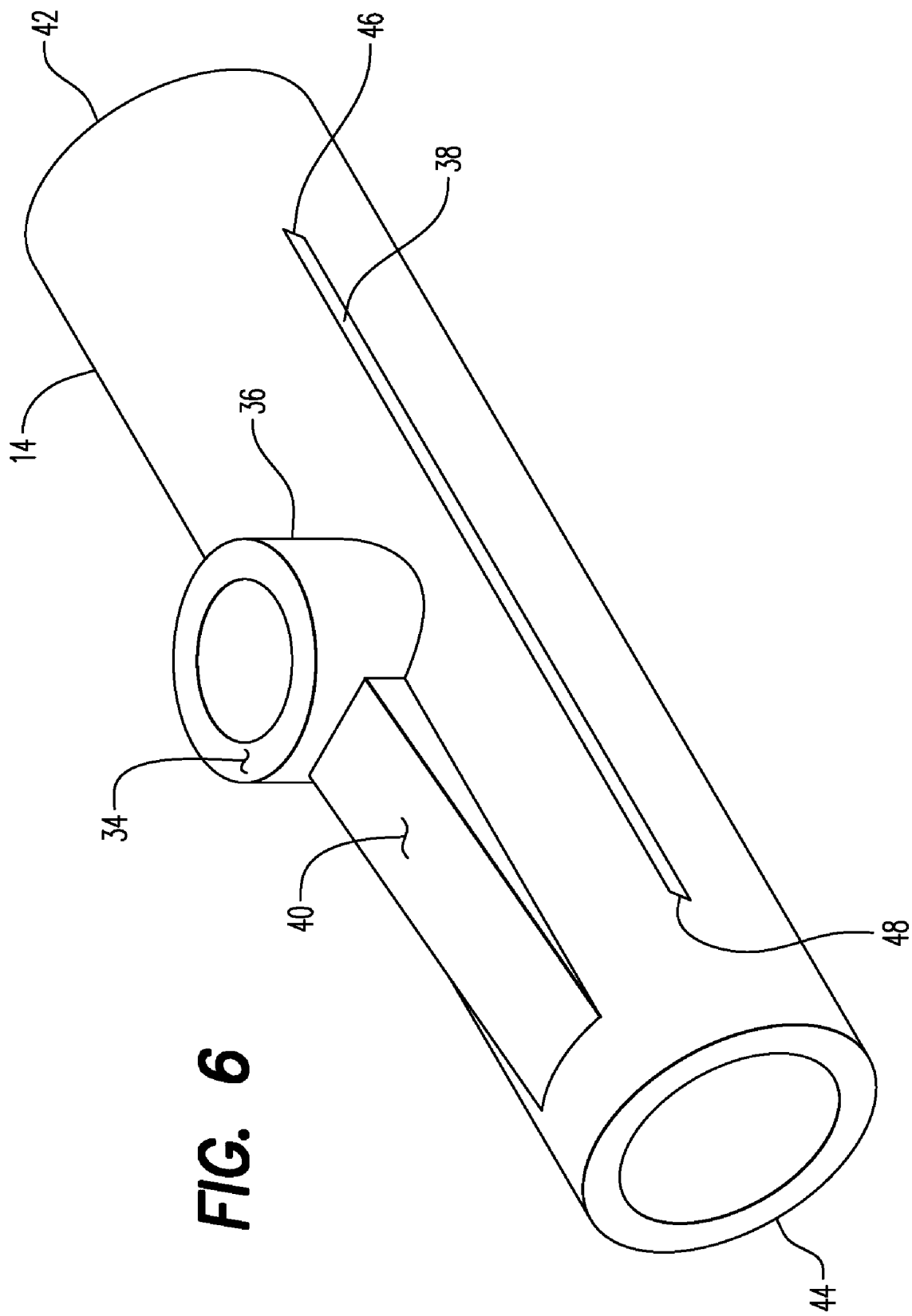
FIG. 6 is a perspective view of the preferred embodiment of the transfer tube of the catch basin of FIGS. 1, 2 and 3.

The transfer tube 14 also includes an elongated flat catch plate 38 which is oriented horizontally and extends transversely across the interior of the transfer tube 14 as best seen in FIGS. 6, 7 and 9. Mating elongated horizontally aligned slots are formed into the sidewall of the transfer tube 14 after which the catch plate 38 is slid into the position shown in FIG. 9 and cemented, mechanically attached or welded in place to become permanently affixed in the position shown. Importantly note that the leading edge 46 of the catch plate 38 is beveled at a 45° angle upwardly, while the trailing edge 48 is beveled at a 45° downwardly for enhanced water flow as will be described herebelow.

The transfer tube 14 further includes a flow-enhancing cavity 50 formed by an upwardly tapered plate 40 which extends at a shallow acute angle away from the longitudinal interior of the transfer tube 14. This cavity 50 is positioned immediately downstream of, and in fluid communication with, the connecting tube 36 and the aperture 34 of the bottom 32. As best seen in FIG. 7, when sand, silt and sediment have accumulated within the catch basin 12, a portion thereof over the aperture 34 will drop down onto the upper surface of the catch plate 38 at A and accumulate sufficiently so as to stop further flow of the sand, silt, and sediment so as to avoid clogging the entire interior of the transfer tube 14 in the vicinity of aperture 34.

Referring additionally to FIG. 8, when water flow is commenced by activating the pump 18 as previously described, the water begins flowing into the inlet end 42, impinging on the tapered lead edge 46 and is split into two streams as shown by the arrows. The smaller water stream flows across the upper surface of catch plate 38 and begins washing the silt and sand and water mixture as a slurry shown at B just down from atop the catch plate 38. The unslurried water passing beneath the catch plate 38 and the heavily slurried water mixture which passes above the catch plate 38 are combined into a diluted slurry at B to exit the transfer tube 14 in the direction of the arrow from the outlet end 44 to be carried through the discharge conduit 24 and the distal end 26 thereof for beach rebuilding and the like as previously described in FIG. 1.

Once the sand, silt, and sediment accumulation at A in FIG. 7 is swept away by flowing water, additional sand and silt will be drawn downwardly in the direction of the arrow through the aperture 34 to be carried away and mixed into a slurry for removal and beach deposit. It should now be clear as to the benefit and efficiency which results from the cavity 50 which facilitates the smooth flow of silt and sand downwardly through the aperture 34 and smoothly blended with the water flowing atop the catch plate 38. There is perhaps a negative pressure area 50 which is created to facilitate drawing the sand and silt downwardly for further enhanced removal efficiency of the sand and silt.

Figure 13:
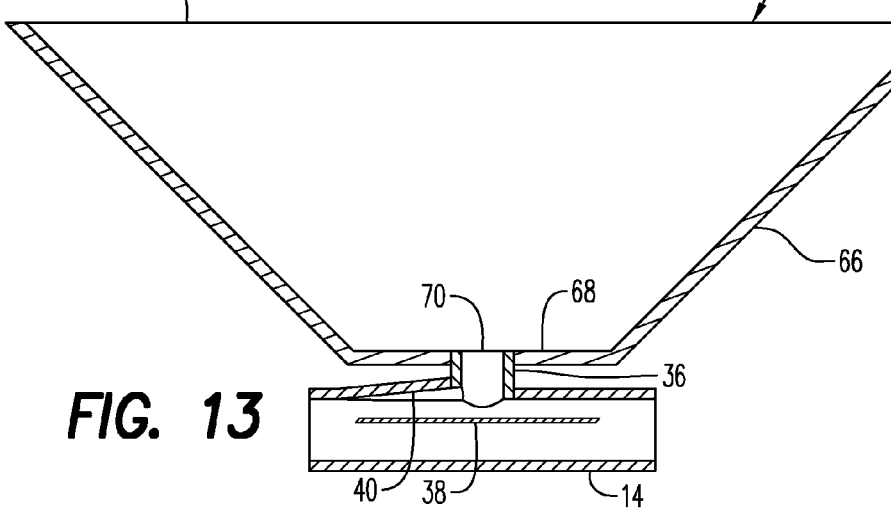
FIG. 13 is a side elevation view of FIG. 12.
Figure 14:
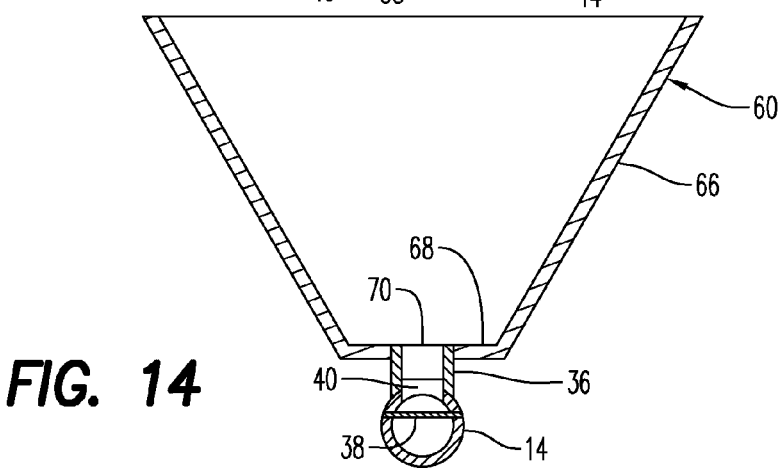
FIG. 14 is a transverse section view of FIG. 12.

Referring now to FIGS. 10 to 14, and a second embodiment of the catch basin is there shown generally at numeral 60 and includes a basin 62 having sloping walls shown typically at 66 which are steeper in nature and represent a more severe sidewall angle within the scope of this disclosure. This sidewall angle is provided where the sand and silt has been determined to be less susceptible to the downward sliding movement by gravity down to the bottom 64 and into the transfer tube 14 as previously described. Flanges 62 extending along each distal edge of each of the side panels 66 add strength and also provide a level of vertical flotation when the catch basin assembly 60 is deployed to prevent excessive sinking of the catch basin 62 into the soil bottom. As best seen in FIG. 13, the longitudinal side panels are oriented at approximately 135° degrees included angle to the bottom 68, while in FIG. 14, that included angle is approximately 120°.

Yet another embodiment of the invention is shown generally at numeral 80 as seen in FIGS. 15 to 19. In this embodiment 80, the transfer tube 92 is as previously described having a horizontally extending catch plate 96 within the interior of the transfer tube 92, directly below the aperture 88 which extends from the bottom 86 downwardly into the interior of the transfer tube 92. The cavity 98 also functions as previously described.

The inlet and outlet conduits 90 and 94 extend diagonally along and within a tunnel at 100 and 104 affixed and extending longitudinally along the lower surfaces of the end side panels shown typically at 84. These tunnels 100, 102 and 104 serve to affix the inlet conduit 90, the transfer tube 92 and the outlet conduit 94 in protected position to facilitate deployment and interconnection to the remaining conduit structure and pump as previously described. The bottom 86 is a double bottom as best seen in FIGS. 15, 17 and 19 so as to maintain a smooth flow of sand and silt from the sidewalls 84 into the aperture 88 as previously described.

Figure 20:
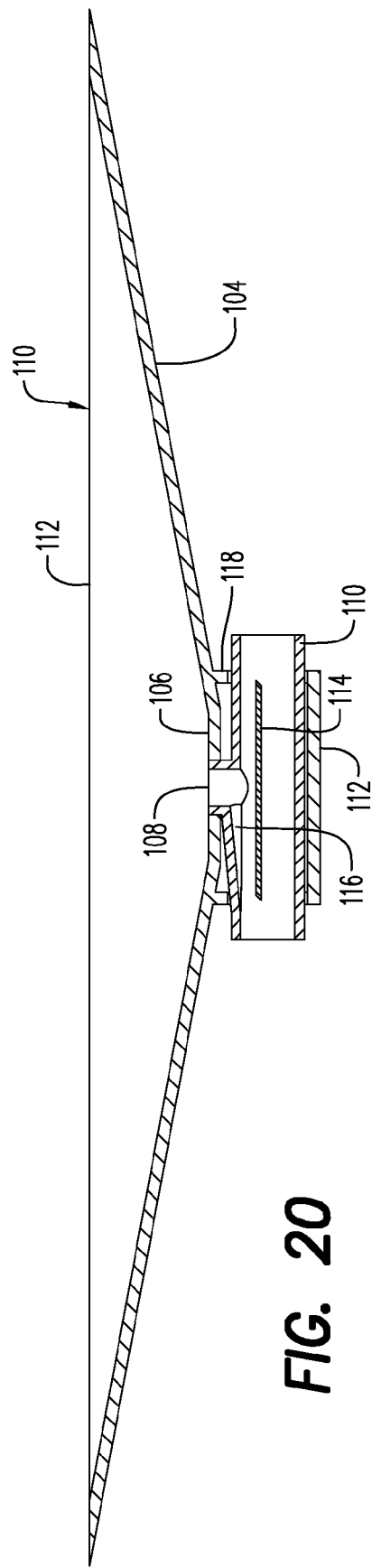
FIGS. 20 and 21 are longitudinal section views of two additional embodiments of the catch basin of the system.

Referring now to FIG. 20, yet another embodiment of the invention is there shown generally numeral 110 and includes a shallow angled basin 112 having very shallow side panels 104 tapering to flat bottom 106 as previously described. The bottom 106 has a centrally disposed aperture 108 leading downwardly into the interior of a transfer tube 110 constructed having a catch plate 114 and a tapered flow-enhancing cavity 116 as previously described. The transfer tube 110 is held securely against the bottom surface of bottom 106 by an encircling collar 112 and held so as to resist angular distortion by supports 118.

Figure 21:
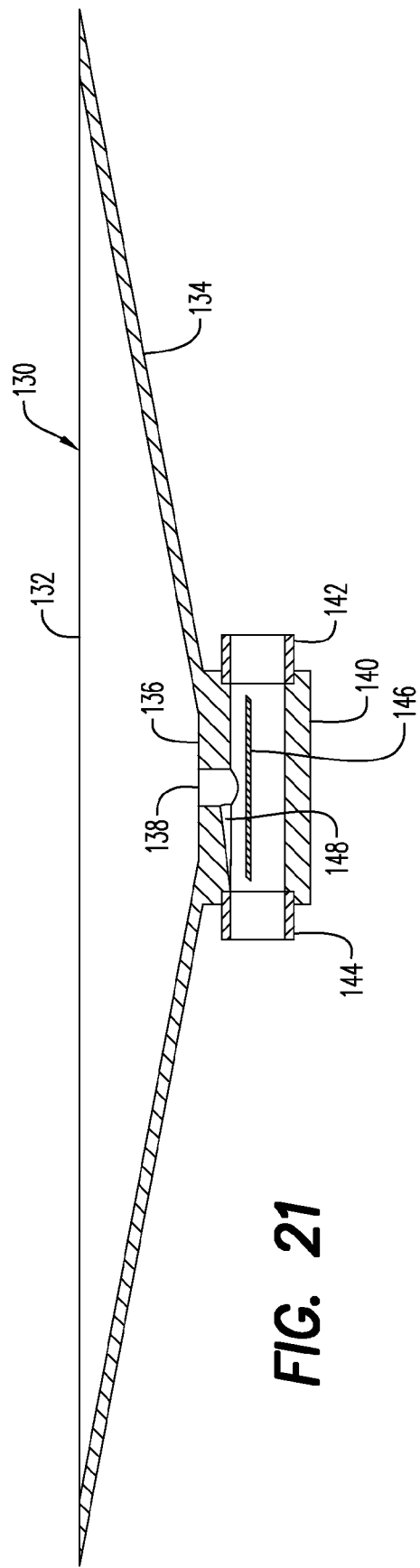

Referring lastly to FIG. 21, still another embodiment of the invention is there shown generally at numeral 130 and includes a shall catch basin 132 with very shallow tapering side panels 134 descending downwardly to smoothly transition with bottom 136. Aperture 138, again, downwardly descends into the interior of an enlarged wall thickness transition tube 140 having conduit couplings 142 and 144 rigidly connected thereto for interconnection to the inlet and outlet conduits as previously described. The wedge shaped flow-enhancing cavity 148 is formed into the interior wall structure of the transfer tube 140 for manufacturing economy.

It is anticipated that the catch basin 10 can be located in various locations such as the outlets of rivers or wherever sand bars tend to form so that the sand and sediment that otherwise would be deposited from the current to the bottom of the water is accumulated in a predetermined position from which it can be pumped to locations on the upland and permitted to dry. The transfer tube may be oriented at any convenient angle to the current flow and shoreline.

As noted, the apparatus of the invention includes the catch basin 10, pump 18 accompanying conduits or pipes 20, 22 and 24 which remove the accumulated sand and sediment by the use of pumps 30 capable of transporting such materials. The function of this invention is the disposition of the catch basin 10 in the particular location that is subject to the formation of sand bars to that the flowing current carrying sand and sediment tends to deposit the sand or sediment into the catch basin rather than on to the bottom of the inlet or area where the sand bar typically forms. The accumulated sand can be removed periodically as the catch basin 10 fills as noted above.

The ultimate preferred embodiment of the invention includes a protective screen fitted over the upper open perimeter of the catch basin to prevent intrusion of sea life and larger debris which would be detrimental to the operation of the system and to also protect sea life in the area. The preferred mesh size of the screen is 1" to 2" square.

While a number of exemplary aspects and embodiments have been discussed above, those of skill in the art will recognize certain modifications, permeations and additions and subcombinations thereof. It is therefore intended that the following appended claims and claims hereinafter introduced are interpreted to include all such modifications, permeations, additions and subcombinations that are within their true spirit and scope.

The invention claimed is:

1. A system for collecting and removing sand and sediment in a water current comprising:
   a catch basin including a bottom and a plurality of angled sidewalls, said bottom having an aperture formed therethrough;
   an elongated transfer tube attached to said catch basin beneath said bottom;
   said transfer tube also having an aperture formed through a wall thereof vertically aligned with and beneath said bottom aperture;
   said transfer tube also having an elongated catch plate horizontally disposed and extending longitudinally across and within a mid-portion of said transfer tube below the aligned apertures to prevent sand and sediment from building up;
   a water pumping system affixed to one end of said transfer tube for pumping water through said transfer tube to remove the sediment or sand from the basin.

2. A system for collecting and removing sand and sediment in a water current as set forth in claim 1, wherein said transfer tube further includes:
   a wedge-shaped cavity above said catch plate formed in a wall of said transfer tube immediately adjacent to, and downstream of said apertures, said cavity being configured for enhancing the flow of sand and sediment downwardly from said basin.

3. A system for collecting and removing sand and sediment in a water current as set forth in claim 2, further comprising:
   an elongated protective tunnel or channel formed along a bottom surface of said basin for supporting and protecting conduits of said water pumping system.

4. A system for collecting and removing sand and sediment in a water current comprising:
   a catch basin and a water pumping system operably connected to said catch basin;
   said catch basin including a basin having a bottom and a plurality of angled sidewalls, said bottom having an aperture formed therethrough;
   said catch basin also including an elongated transfer tube attached to said basin beneath said bottom;
   said transfer tube having an aperture formed through a wall thereof aligned with and beneath said bottom aperture;
   said transfer tube also having an elongated catch plate horizontally disposed and extending longitudinally across and within a mid-portion of said transfer tube below the aligned apertures to prevent sand and sediment from building up;
   said pumping system pumping water through said transfer tube for removing the sediment or sand from the basin.

5. A system for collecting and removing sand and sediment in a water current as set forth in claim 4, wherein said transfer tube further includes:
   a wedge-shaped cavity above said catch plate formed in a wall of said transfer tube immediately adjacent to, and downstream of said apertures, said cavity being configured for enhancing the flow of sand and sediment downwardly from said basin.

6. A system for collecting and removing sand and sediment in a water current as set forth in claim 5, further comprising:
   an elongated protective tunnel or channel formed along a bottom surface of said basin for supporting and protecting conduits of said water pumping system.

* * * * *